(No Model.)

L. S. WRIGHT.
COFFEE OR TEA POT.

No. 397,883. Patented Feb. 12, 1889.

WITNESSES:
C. L. Bendicon
J. J. Laass.

INVENTOR
Luther S. Wright
BY
Duell & Benedict
ATTORNEYS

UNITED STATES PATENT OFFICE.

LUTHER S. WRIGHT, OF GROTON, NEW YORK, ASSIGNOR OF ONE-HALF TO DUNCAN McLACHLAN, OF SAME PLACE.

COFFEE OR TEA POT.

SPECIFICATION forming part of Letters Patent No. 397,883, dated February 12, 1889.

Application filed February 15, 1888. Serial No. 264,147. (No model.)

*To all whom it may concern:*

Be it known that I, LUTHER S. WRIGHT, of the town of Groton, in the county of Tompkins and State of New York, have invented certain new and useful Improvements in Coffee or Tea Pots; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

Figure 1:
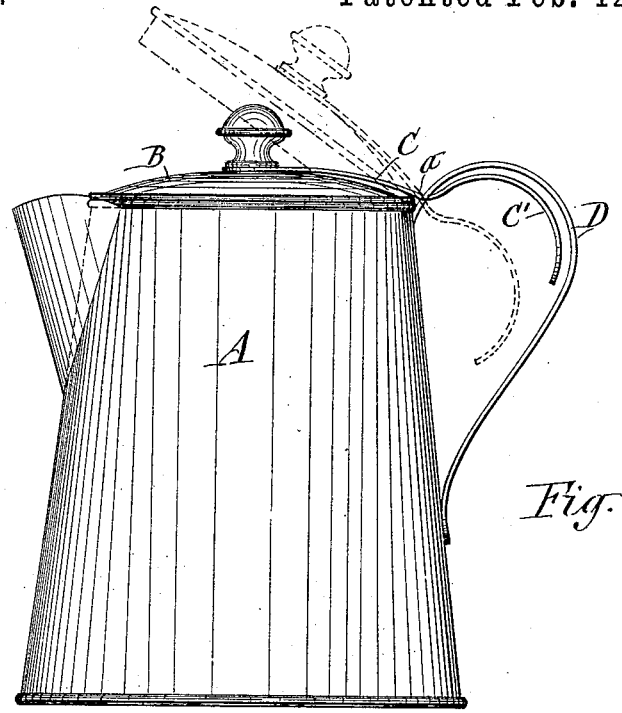
Figure 2:
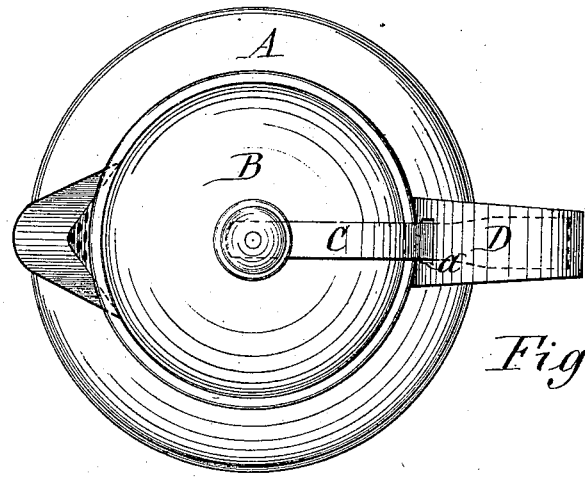

In the drawings, Figure 1 represents a side elevation of a coffee or tea pot embracing my invention, and Fig. 2 is a top plan view of the same.

Similar letters of reference indicate corresponding parts.

The nature of my invention consists in novel means for connecting the lid to a coffee or tea pot and for securely holding said lid in a closed position while the person using the same is pouring out the liquid.

The practical advantage of my invention will readily suggest itself to all. In attaching the lid to the coffee-pot the hinge now used to hold the lid in its place is dispensed with. By means of a lever attached to the top of the lid the lid is held tightly in its place while the person is pouring the liquid from the coffee or tea pot through the spout. As now used the lid of the coffee-pot is frequently raised while the liquid is in the act of being poured out, thus throwing the contents of the coffee-pot into the vessel and seriously interfering with the work.

In the accompanying drawings, A represents the coffee-pot, and B the lid of the same. C C' represents the lever attached to the top of the lid B.

D represents the handle to the coffee-pot provided with the slot $a$, through which the lever C passes endwise. The lever C is made of metal, and may be flat or rounded, as desired. It is intended to be curved to correspond with the shape of the handle, and is under the upper portion of the handle, and when the lid is tightly in place the lever is brought close to the under side of the handle. The slot $a$ is made in the handle near the point where the handle is connected to the coffee-pot, and after passing through this slot $a$ the lever C passes along the top of the lid B, to the center of the same, where it is rigidly attached to the lid. When it is desired to raise the lid, the lever C beneath the handle is lowered; but when the person is using the coffee-pot to pour out the liquid and desires the lid to remain tight, then the lever and handle are held close together in the hand, and this keeps the lid tightly in place.

Having thus described my invention, what I claim as new, and desire to secure by Letters Patent, is—

The combination, with the pot A and lid B, of the handle D, fastened at both ends to the pot and provided with the slot $a$, and the lever C C', rigidly secured to the lid, passing through the aforesaid slot and curved to correspond to the under side of the handle and lie in proximity thereto when the lid is closed.

In testimony whereof I have hereunto signed my name and affixed my seal, in the presence of two attesting witnesses, at Cortland, in the county of Cortland, in the State of New York, this 8th day of February, 1888.

LUTHER S. WRIGHT. [L. S.]

Witnesses:
 R. H. DUELL,
 E. D. MALLORY.